US008151191B2

(12) United States Patent
Nicol, II (10) Patent No.: US 8,151,191 B2
(45) Date of Patent: Apr. 3, 2012

(54) MANAGING OBJECTIONABLE MATERIAL IN 3D IMMERSIVE VIRTUAL WORLDS

(75) Inventor: William B. Nicol, II, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1034 days.

(21) Appl. No.: 11/952,598

(22) Filed: Dec. 7, 2007

(65) Prior Publication Data

US 2009/0150778 A1 Jun. 11, 2009

(51) Int. Cl.
*G06F 3/00* (2006.01)
*G06F 17/00* (2006.01)
*G06F 3/048* (2006.01)

(52) U.S. Cl. .................. 715/706; 715/203; 715/757

(58) Field of Classification Search .............. 715/230, 715/706, 757
See application file for complete search history.

(56) References Cited

U.S. PATENT DOCUMENTS

| 6,466,213 | B2 * | 10/2002 | Bickmore et al. | 345/473 |
|---|---|---|---|---|
| 7,006,098 | B2 * | 2/2006 | Bickmore et al. | 345/474 |
| 7,073,129 | B1 * | 7/2006 | Robarts et al. | 715/740 |
| 7,091,976 | B1 * | 8/2006 | Ostermann et al. | 345/473 |
| 7,379,066 | B1 * | 5/2008 | Ostermann et al. | 345/473 |
| 7,386,799 | B1 * | 6/2008 | Clanton et al. | 715/758 |
| 7,468,729 | B1 * | 12/2008 | Levinson | 345/473 |
| 7,636,755 | B2 * | 12/2009 | Blattner et al. | 709/206 |
| 7,671,861 | B1 * | 3/2010 | Ostermann et al. | 345/473 |
| 7,697,668 | B1 * | 4/2010 | Ostermann et al. | 379/100.08 |
| 2002/0109719 | A1 * | 8/2002 | Hata et al. | 345/748 |

* cited by examiner

*Primary Examiner* — William Bashore
*Assistant Examiner* — David Phantana Angkool
(74) *Attorney, Agent, or Firm* — DeLizio Gilliam, PLLC (57) ABSTRACT

A method of and system for managing objectionable content in a virtual world associates a tag with an attribute associated with an avatar in the virtual world. The method places a limitation on the avatar in the virtual world based upon information in the tag while the tagged attribute is associated with the avatar.

11 Claims, 6 Drawing Sheets

MANAGING OBJECTIONABLE MATERIAL IN 3D IMMERSIVE VIRTUAL WORLDS

BACKGROUND OF THE INVENTION

1. Technical Field

The present invention relates generally to the field of 3D immersive virtual worlds and more particularly to a method of and system for managing objectionable content in a 3D immersive virtual world.

2. Description of the Related Art

A virtual world is a computer based simulated environment intended for its users or residents to inhabit and interact via avatars, which are three-dimensional animated, typically humanoid, figures. The virtual world, being computer-simulated, typically appears similar to the real world with real-world rules such as gravity, typography, locomotion, real-time actions, and communication. Residents, through their avatars, can explore the virtual world, meet other residents, socialize, participate in individual and group activities, create and trade items and services with one another.

Residents of a virtual world are free to express their individuality and creativity through their appearance, dress, accessories, and other attributes. Some residents may not feel bound by the social norms of the real world. For example, some residents may dress their avatars in clothing that would not be appropriate in many situations in the real world. Additionally, some residents may create bodily appearances for their avatars that are so bizarre as to be frightening to some people, such as children.

In virtual worlds, individuals do not always have control over inappropriate content in the form of avatars dress, mannerisms, and actions. In the traditional Web, there are parental control programs that can help manage access to certain objectionable content. However, in a virtual world, an avatar with inappropriate dress or appearance can walk into the view area of another user. Currently, certain avatars can be labeled as threatening or offensive and can be prohibited from certain areas are removed from the virtual world altogether. However, this is managed and policed by the operator of the virtual world. Certain areas in the virtual world may be labeled as areas with mature content, whereby avatars associated with users under a certain age are blocked from entering such areas. Also, groups of users can set up areas that can be entered only by avatars associated with members of the group. However, there currently is no way to manage objectionable content on an individual or attribute basis.

SUMMARY OF THE INVENTION

The present invention provides a method of and system for managing objectionable content in a virtual world. An embodiment of the method of the present invention includes the step of associating a tag with an attribute associated with an avatar in the virtual world. For example, an attribute may be an article of clothing worn by the avatar. The method places a limitation on the avatar in the virtual world based upon information in the tag while the tagged attribute is associated with the avatar.

In certain instances, the information in the tag may include information that the attribute is offensive to a particular user. In other instances, the information in the tag may include information that the attribute is offensive to a class of users. Examples of classes of users include users under a certain age, users having various cultural or religious backgrounds or affiliations, etc. In still other instances, the information in the tag may include information that the attribute is inappropriate in a specified situation. For example, the tagging user may consider the attribute, such as an article of clothing, to be inappropriate in a business setting but appropriate in other settings.

The limitation may include blocking the avatar from entering a field of view into the virtual world of a particular user or a member of a class of users or into an area in the virtual world where a specified situation exits. The limitation may include changing the appearance of the attribute to a non-offending appearance prior to entry of the avatar into a field of view of a particular user or a member of a class of users or into an area in the virtual world where a specified situation exits. The appearance of the attribute may be changed by blurring the attribute, changing the attribute itself, or the like. In some embodiments, a user may be enabled to select what limitation to apply to the attribute.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
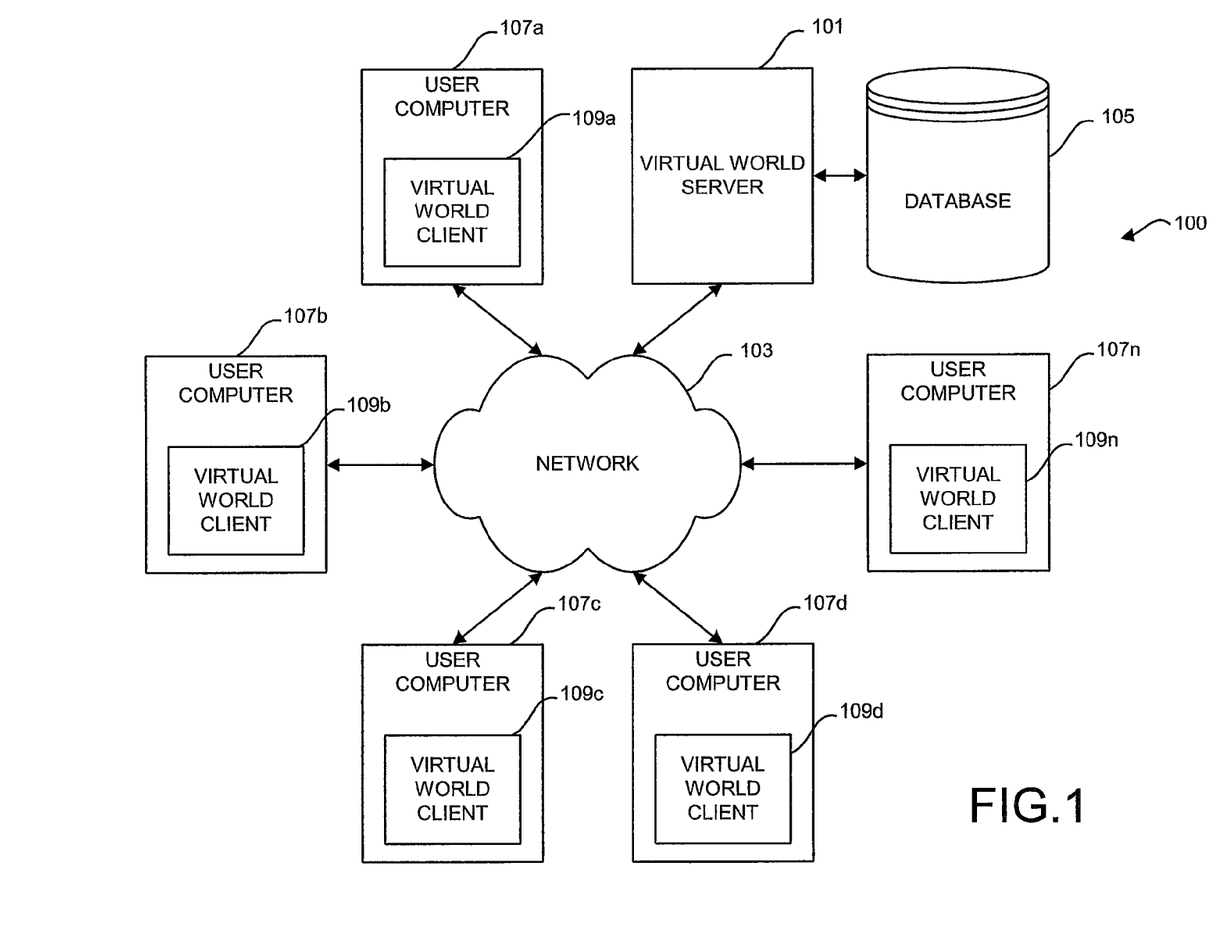
FIG. 1 is a block diagram of an embodiment of a system according to the present invention.

Referring now to the drawings, and first FIG. 1, a system according to the present invention is designated generally by the numeral 100. System 100 includes a virtual world server 101. Virtual world server 101 is typically a large computer system in which the virtual world exists. Virtual world server 101 is connected to a network 103, such as the Internet. Virtual world server 101 is also coupled a database 105, which contains all of the objects in the virtual world and their associated attributes. A plurality of user computers 107 are connected to network 103. User computers 107 may be a computing device, such as personal computers, notebook computers, personal digital assistants, cell phones, and the like. Each user computer 107 has installed thereon a virtual world client application 109. Virtual world client 107 renders a portion of the virtual world on user computer 107 and allows the user to control the actions of his or her avatar.

Figure 2:
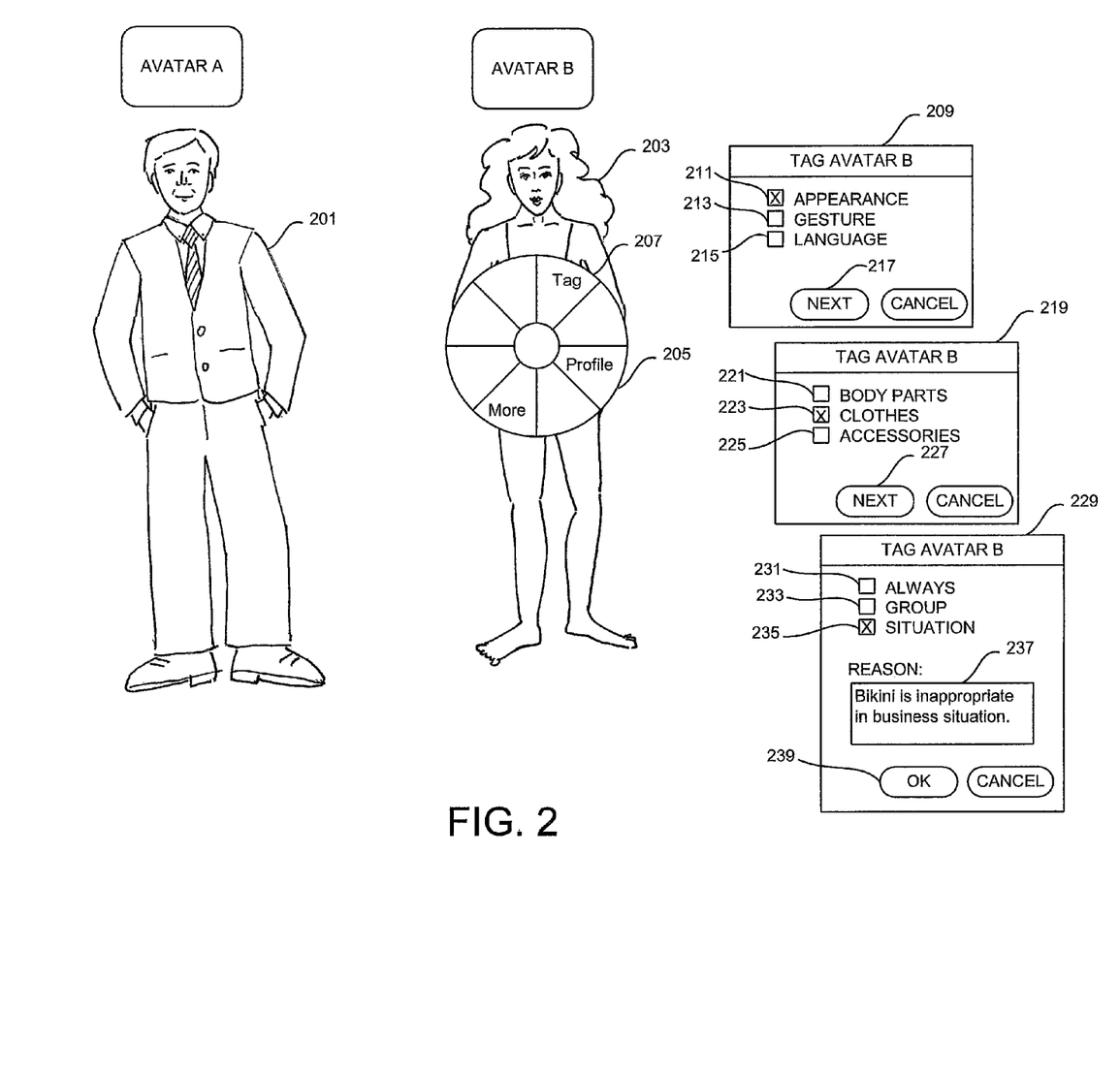
FIG. 2 is an illustration of a view into a virtual world according to an embodiment of the present invention.

FIG. 2 illustrates a view into a virtual world from a user computer. The user of the computer is represented in the virtual world by an avatar 201. The user's avatar 201 is identified in the virtual world by the name AVATAR A. A second avatar 203 is identified in the virtual world by the name AVATAR B. Avatar 203 is associated with another human user. As is known to those skilled in the art, users can move about, communicate, transact business, and essentially live in the virtual world through their associated avatars.

In the example of FIG. 2, the user associated with avatar 201 finds the clothing worn by avatar 203 to be inappropriate in some way. The clothing may be obscene, indecent, or scandalous, per se, inappropriate for a particular situation, inappropriate for view by persons in particular groups, such as children, or persons having particular social or cultural norms, or otherwise objectionable to the user associated with avatar 201. It should be recognized that clothing is only an example of one type of attribute associated with an avatar that the user may deem to be inappropriate. Those skilled in the art will recognize that other objectionable attributes, such as bodily or facial appearance, accessories, gestures, language, or the like, may be controlled according to the present invention.

According to the present invention, the user associated with avatar 201 can tag the objectionable clothing worn by avatar 203. As will described in detail hereinafter, tagging an attribute places limitations on the avatar while the attribute is associated with the avatar. In one embodiment of the present invention, the user associated with avatar 201 can place his or her mouse pointer on avatar 203. Right clicking his or her mouse causes a control 205 to be displayed. According to the present invention, control 205 includes a tag button 207. Left clicking on tag button 207 causes a tagging menu 209 to be displayed. Tagging menu 209 includes an appearance checkbox 211, a gesture checkbox 213, and the language checkbox 215. The user associated with avatar 201 can identify the category of objectionable content by checking one of check boxes 211-215 and actuating a next button 217.

Actuation of next button 217 causes an appearance tagging menu 219 to be displayed. Appearance tagging menu 219 includes a body parts checkbox 221, a clothing checkbox 223, and an accessories checkbox 225. The user associated with avatar 201 can identify the objectionable appearance attribute by checking one of checkboxes 221-225 and actuating a next button 227. Actuation of next button 227 causes a clothing tagging dialog 229 to be displayed. Clothing tagging dialog 229 enables the user associated with avatar 201 to specify how or when the limitations imposed by the tag will be applied.

Clothing tagging dialog 229 includes an always checkbox 231, a group checkbox 233, and the situation checkbox 235. If the user checks always checkbox 223, the limitations of the tag will always be applied when avatar 201 encounters avatar 203 wearing the tagged clothing. If the user checks group checkbox 223, the limitations of the tag will be applied whenever an avatar associated with a member of the group encounters avatar 203 wearing the tagged clothing. If the user checks situation checkbox 235, the limitations of tag will be applied whenever avatar be approaches a specified situation. Examples of situations include business situations, worship situations, and other situations in which the tagged clothing would be offensive or distracting. Clothing tagging dialog 229 includes a reason text entry field 237 into which the user can enter information about why the tagged clothing is objectionable. When the user actuates OK button 239, a tag is added to the tag article of clothing. The user associated with avatar 203 may be notified that the article of clothing has been tag and the reason for the tagging. The creator of the article of clothing may also be notified. The creator of the clothing may add the tag to future versions of the article of clothing or change the appearance of future versions. The seller, if any, of the clothing may also be notified of the tagging so that the seller may add the tag to clothing in inventory. It should be recognized that the sequence of menus illustrated in, and describe with reference to, FIG. 2 are only examples in which the offending attribute is an article of clothing. Those skilled in the art will recognize that other sequences of menus would be displayed in connection with tagging other types of attributes.

Figure 3:
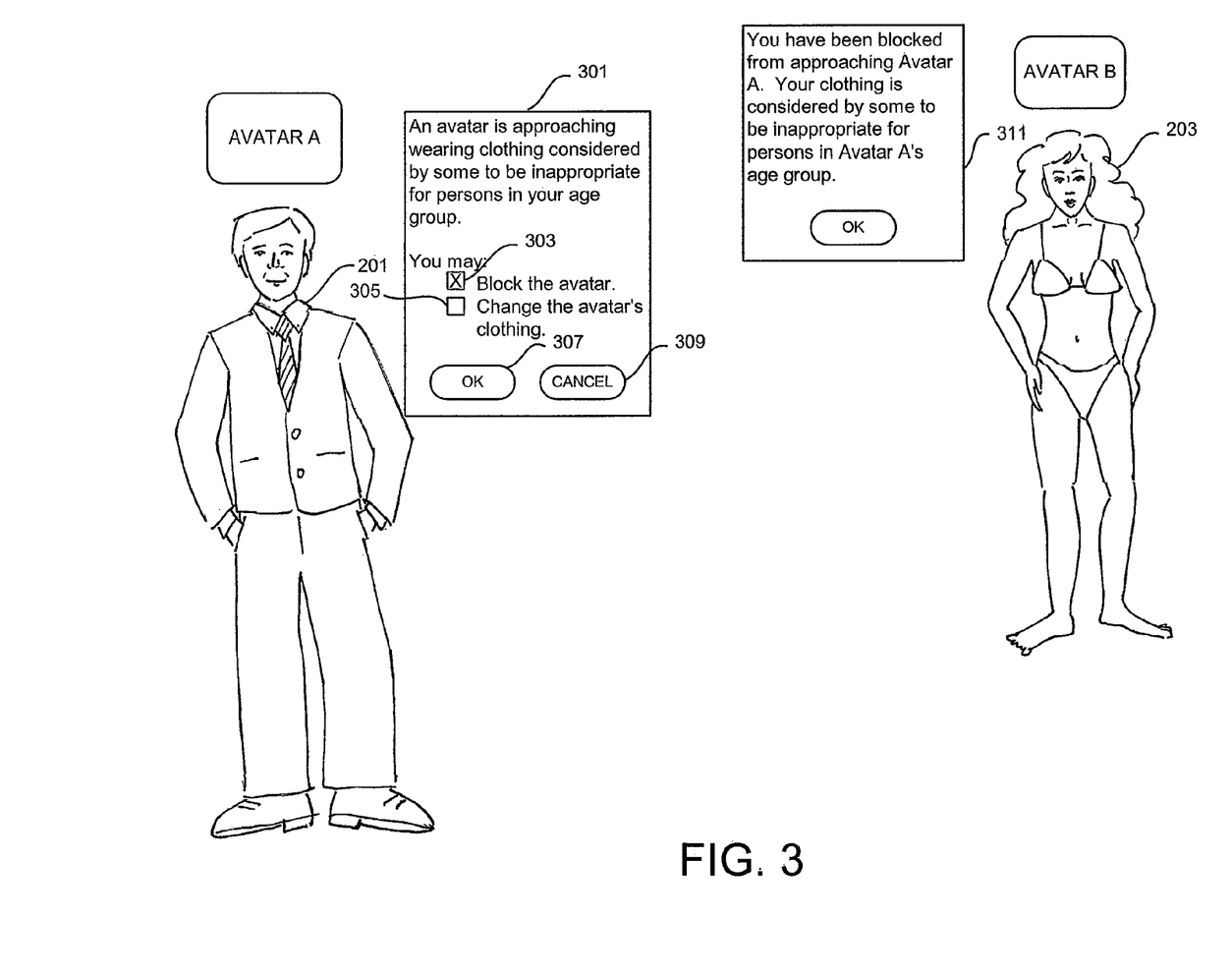
FIG. 3 is an illustration of a second view into a virtual world according to an embodiment of the present invention.

FIG. 3 illustrates a view into the virtual world. When avatar 203, wearing the tagged clothing, approaches avatar 201, who may be the tagging avatar or an avatar representing a member of class of users or an avatar in a particular situation, the system may display a warning dialog 301 to the user associated with avatar 201. In certain situations, the system may not display a warning dialog. For example, where the tagged attribute is always offensive to the user, the system may execute the limitation of the tag, such as blocking avatar 203 from approaching avatar 201 automatically, without informing the user.

Warning dialog 301 includes a block the avatar checkbox 303 and a change the avatar's clothing checkbox 305. If the user associated with avatar 201 checks checkbox 303 and actuates OK button 307, avatar 203 is blocked from entering the field of view of the user associated with avatar 201. If the user checks checkbox 305 and actuates OK button 307, the clothing worn by avatar 203 will be changed to something not offending. For example, when a user first joins a virtual world, the user is typically dressed in plain clothing. According to the present invention, the clothing worn by avatar 203 can be changed to the generic plain clothing provided by the virtual world. The user associated with avatar 201 can ignore warning dialog 301 by actuating cancel button 309. Parental controls or the like may not give the user who is a member of a group, such as children, a choice about how to handle avatar 203. In such cases, avatar 203 would be automatically blocked. When avatar 203 is blocked, the system displays to the user associated with avatar 203 a message 311 advising the user of the block and the reason for the block.

Figure 4:
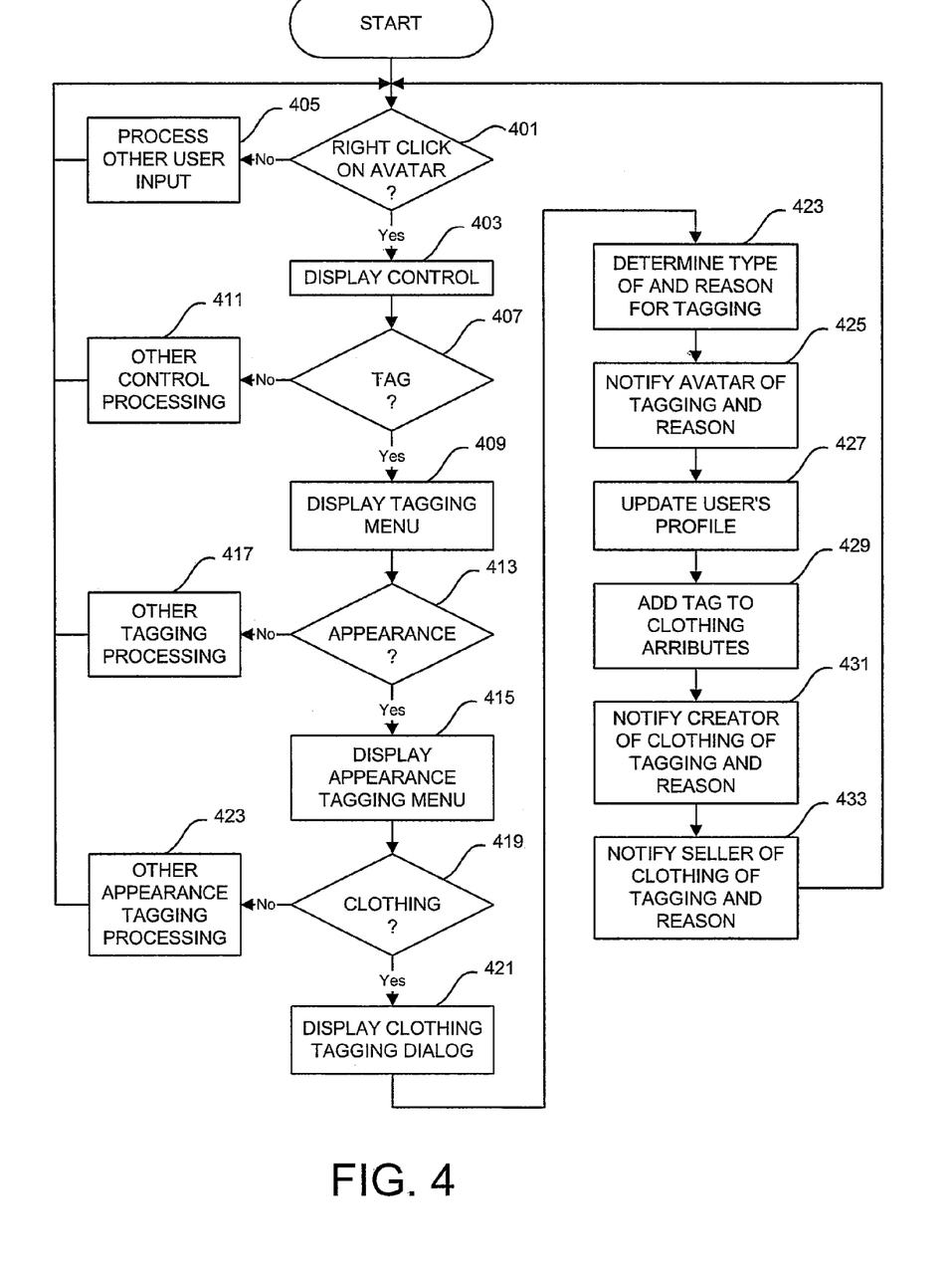
FIG. 4 is a flow chart of an embodiment of tagging according to the present invention.

FIG. 4 is a flow chart of an embodiment of tagging process according to the present invention. The system waits for user input. If as determined at decision block 401, the user input is a right-click on avatar, the system displays control 205 of FIG. 2, as indicated at block 403. If the user input is not a right-click on avatar, the system performs other user input processing, as indicated generally at block 405. If, as determined at decision block 407, the user actuates tag button 207 of FIG. 2, the system displays tagging menu 209 of FIG. 2, as indicated at block 409. If the user does not actuate tag button, the system performs other control processing, as indicated at block 411. If, as determined at decision block 413, the user selects appearance checkbox 211 of tagging menu 409 of FIG. 2, the system displays appearance tagging menu 219 of FIG. 2, as indicated at block 415. If not, the system performs other tagging processing, as indicated generally at block 417. If, as determined at decision block 419, the user checks clothing checkbox 223 of appearance tagging menu 219 of FIG. 2, the system displays clothing tagging dialog 229 of FIG. 2, as indicated at block 421. If not, the system performs other appearance tagging processing, as indicated generally at block 423. The system determines the type of, and reason for, the tagging, from clothing tagging dialog 229, as indicated at block 423. Then, the system notifies the user associated with the tagged article of clothing of the tagging and the reason for the tagging, as indicated at block 425. The system may update the tagging user's profile, at block 427. The system adds the tag to the clothing attributes, at block 429. The system may notify the person who created the clothing of the tagging and the reason for the tagging, as indicated at block 431. The system may also notify the seller of the clothing of the tagging and the reason for the tagging, as indicated at block 433.

Figure 5:
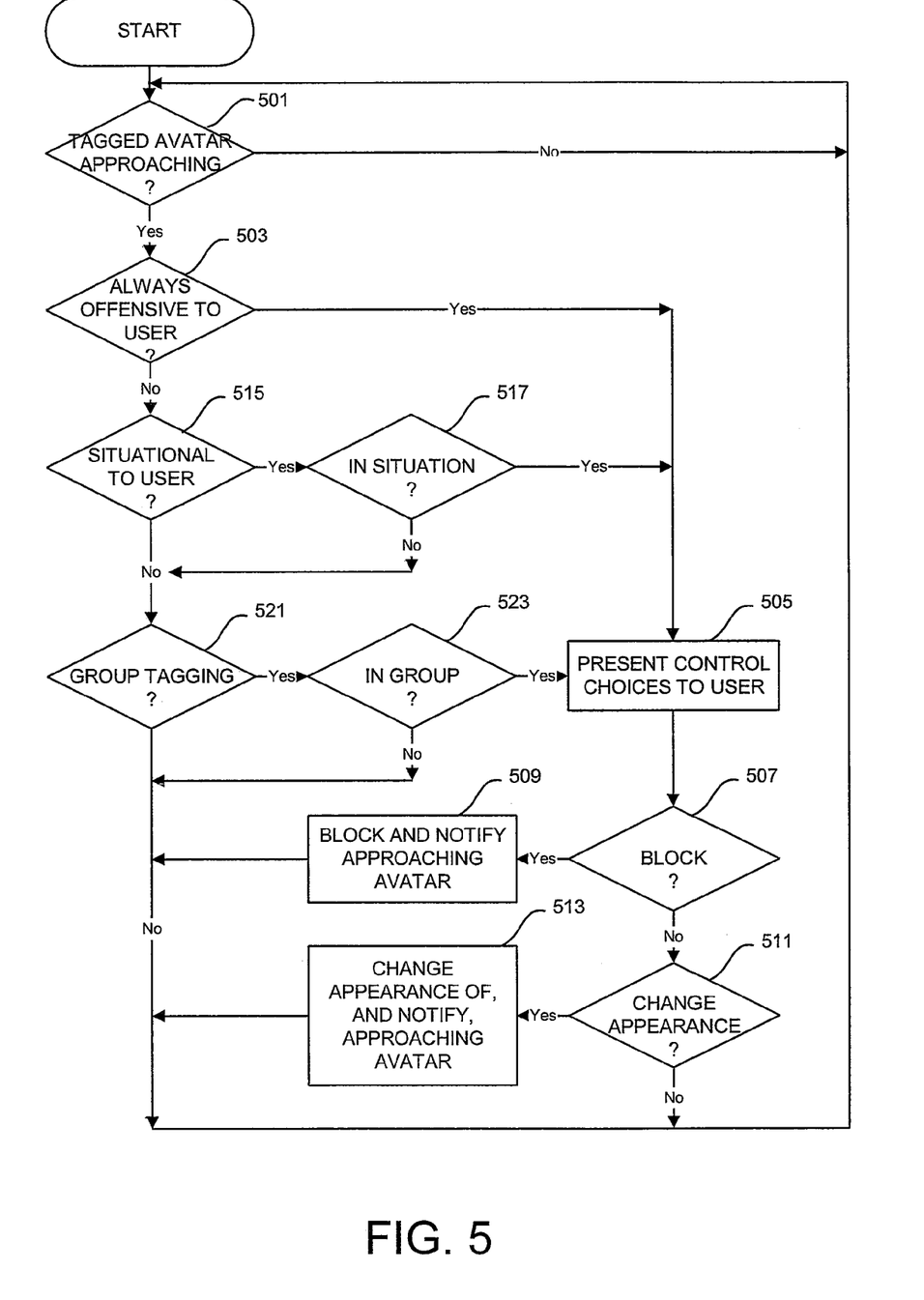
FIG. 5 is a flow chart of an embodiment of avatar control according to the present invention; and, FIG. 6 is a block diagram of a generic information handling system capable of performing the operations according to the present invention.

FIG. 5 is a flow chart of an embodiment of tagged attribute processing according to the present invention. When an avatar with a tagged attribute approaches another avatar, as determined at decision block 501, the system determines, at decision block 503, if the tagged attribute is always offensive to the user associated with the approached avatar. If so, in the embodiment FIG. 5, the system presents limitation control choices to the user, as indicated at block 505. If, as determined at decision block 507, the user chooses to block the avatar, the system blocks and notifies the approaching avatar, at block 509. If, as determined at decision block 511, the user elects to change the appearance of the approaching avatar, the system changes the appearance of and notifies the approaching avatar, as indicated at block 513. In alternative embodiments, the system may be configured to block and notify the approaching avatar automatically without presenting limitation control choices to the user. If, as determined at decision block 515, the tagged attribute is situational, the system determines, at decision block 517, if the approached avatar is in the situation. If so, processing proceeds to block 505. Alternatively, the system may automatically block and notify the approaching avatar. If, as determined at decision block 515 the tagging is not situational, or as determined at decision block 517, the approach to avatar is not in the situation, the system determines, at decision block 521, if the attribute is tagged as being inappropriate for members of a particular group. If so, the system determines at, decision block 523, if the approached avatar is a member of that group. If so, processing proceeds to block 505. Alternatively, the user's system may be configured to block and notify the approaching avatar automatically without present limitation control choices to the user. For example, in the case child users parental controls may be set so that the child is not given a choice about whether to see avatars with tagged attributes.

Figure 6:
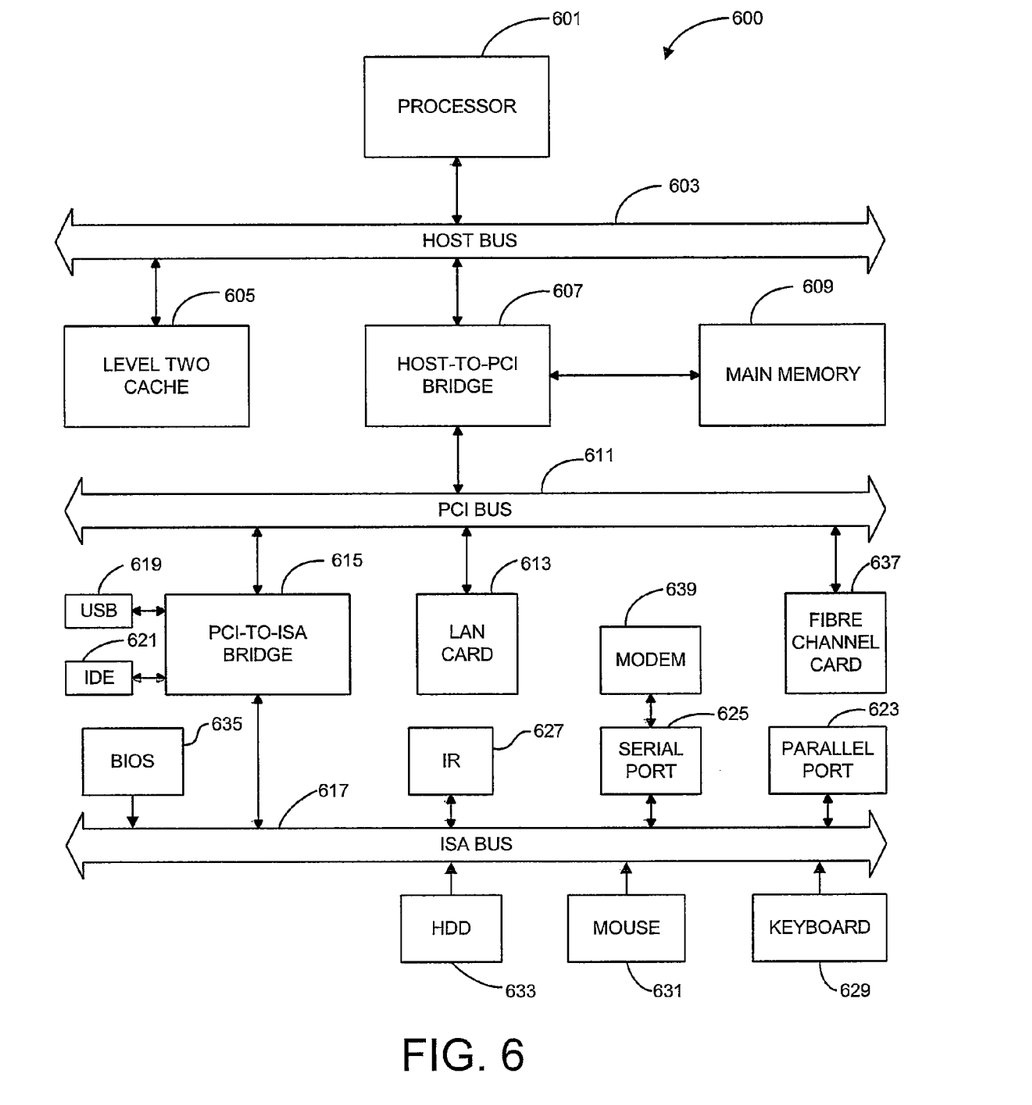

Referring now to FIG. 6, there is illustrated a block diagram of a generic information handling system 600 capable of performing the operations described herein. Computer system 600 includes processor 601 which is coupled to host bus 603. Processor 601 preferably includes an onboard cache memory. A level two (L2) cache memory 605 is also coupled to host bus 603. A Host-to-PCI bridge 607 is coupled to host bus 603. Host-to-PCI bridge 607, which is coupled to main memory 609, includes its own cache memory and main memory control functions. Host-to-PCI bridge 607 provides bus control to handle transfers among a PCI bus 611, processor 601, L2 cache 605, main memory 609, and host bus 603. PCI bus 611 provides an interface for a variety of devices including, for example, a local area network (LAN) card 613, a PCI-to-ISA bridge 615, which provides bus control to handle transfers between PCI bus 611 and an ISA bus 617, a universal serial bus (USB) 619, and an IDE device 621. PCI-to-ISA bridge 615 also includes onboard power management functionality. PCI-to-ISA bridge 615 can include other functional elements not shown, such as a real-time clock (RTC), DMA control, interrupt support, and system management bus support.

Peripheral devices and input/output (I/O) devices can be attached to various interfaces or ports coupled to ISA bus 617. Such interfaces or ports may include a parallel port 623, a serial port 625, an infrared (IR) interface 627, a keyboard interface 629, a mouse interface 631, and a hard disk drive (HDD) 633.

A BIOS 635 is coupled to ISA bus 617. BIOS 635 incorporates the necessary processor executable code for a variety of low-level system functions and system boot functions. BIOS 635 can be stored in any computer readable medium, including magnetic storage media, optical storage media, flash memory, random access memory, read only memory, and communications media conveying signals encoding the instructions (e.g., signals from a network). In order to couple computer system 600 to another computer system to copy files or send and receive messages over a network, LAN card 613 may be coupled to PCI bus 611. Similarly, a Fibre Channel card may be coupled to PCI bus 613. Additionally, a modem 639 may be coupled to ISA bus 617 through serial port 625 to support dial-up connections.

While the computer system described in FIG. 6 is capable of executing the invention described herein, the illustrated system is simply one example of a computer system. Those skilled in the art will appreciate that many other computer system designs are capable of performing the invention described herein.

One of the preferred implementations of the invention is an application, namely, a set of instructions (program code) in a code module that may, for example, be in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Although invention has been illustrated and described in detail with respect to mashups, those skilled in the art will appreciate that embodiments of the present invention are applicable to other web-based applications. Accordingly, the foregoing description is intended for purposes of illustration and not of limitation.

What is claimed is:

1. A method comprising:

receiving an input through a computer input device from a first user that is controlling a first avatar in a virtual world, the input configured to tag an attribute of a second avatar in the virtual world, wherein the attribute is defined to be at least one of an attribute that the first user does not want to view in the virtual world and an attribute that the first user is not allowed to view in the virtual world based on a parental control, wherein the attribute comprises at least one of clothing, body gesture and language of the second avatar;

associating the tag with the attribute of the second avatar in the virtual world;

placing a limitation on the second avatar in the virtual world in response to associating the tag with the attribute of the second avatar, wherein the placing of the limitation comprises, responsive to the second avatar attempting to enter a field of view of the first avatar, blocking the second avatar from entering the field of view of the first avatar in the virtual world; and notifying a second user that is controlling the second avatar regarding the associating of the tag with the attribute.

2. The method as claimed in claim 1, wherein placing the limitation on the second avatar in the virtual world comprises:
responsive to second avatar attempting to enter a field of view of at least one avatar representing a member of a class of users, blocking the second avatar from entering the field of view of the at least one avatar.

3. The method as claimed in claim 1, wherein placing the limitation on the second avatar in the virtual world comprises:
responsive to second avatar attempting to enter a field of view of the first avatar in a specified situation, blocking the second avatar from entering the field of view of the first avatar.

4. The method as claimed in claim 1, wherein the attribute comprises clothing, wherein placing the limitation on the second avatar in the virtual world comprises:
responsive to the second avatar attempting to enter a field of view of the first avatar, changing the clothing of the second avatar prior to the second avatar entering the field of view of the first avatar.

5. The method as claimed in claim 1, wherein the attribute comprises clothing, wherein the method comprises:
notifying at least one of a creator and a seller of the clothing regarding the associating of the tag with the attribute.

6. The method as claimed in claim 1, wherein placing the limitation on the second avatar in the virtual world comprises:
notifying the first user that is controlling the first avatar of an approach by the second avatar in the virtual world; and,
enabling the first user to control the second avatar.

7. The method as claimed in claim 6, wherein said control comprises:
blocking the second avatar from entering a field of view of the first avatar in the virtual world.

8. The method as claimed in claim 6, wherein said control comprises:
changing said attribute prior to entry of the second avatar into a field of view of the first avatar in the virtual world.

9. A computer program product for providing content and services, the computer program product comprising:
a computer readable storage medium having computer usable program code embodied therewith the computer usable program code comprising a computer usable program code configured to:
receive an input through a computer input device from a first user that is controlling a first avatar in a virtual world, the input configured to tag an attribute of a second avatar in the virtual world, wherein the attribute is defined to be at least one of an attribute that the first user does not want to view in the virtual world and an attribute that the first user is not allowed to view in the virtual world based on a parental control, wherein the attribute comprises at least one of clothing, body gesture and language of the second avatar;
associate the tag with the attribute of the second avatar in the virtual world;
place a limitation on the second avatar in the virtual world in response to associating the tag with the attribute of the second avatar, wherein the computer usable program code configured to place of the limitation comprises,
responsive to the second avatar attempting to enter a field of view of the first avatar, computer program code configured to block the second avatar from entering the field of view of the first avatar in the virtual world; and
notify a second user that is controlling the second avatar regarding the associating of the tag with the attribute.

10. The computer program product as claimed in claim 9, wherein the computer usable program code configured to place of the limitation on the second avatar in the virtual world comprises:
computer usable program code configured to, responsive to second avatar attempting to enter a field of view of at least one avatar representing a member of a class of users, block the second avatar from entering the field of view of the at least one avatar.

11. The computer program product as claimed in claim 9, wherein the computer usable program code configured to place the limitation on the second avatar in the virtual world comprises:
computer usable program code configured to, responsive to second avatar attempting to enter a field of view of the first avatar in a specified situation, block the second avatar from entering the field of view of the first avatar.

\* \* \* \* \*